United States Patent
He (10) Patent No.: US 12,382,321 B2
(45) Date of Patent: Aug. 5, 2025

(54) RADIO RESOURCE MANAGEMENT MEASUREMENT RELAXATION FOR STATIONARY USER EQUIPMENTS

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 17/651,171

(22) Filed: Feb. 15, 2022

(65) Prior Publication Data

US 2022/0312243 A1 Sep. 29, 2022

Related U.S. Application Data

(60) Provisional application No. 63/166,514, filed on Mar. 26, 2021.

(51) Int. Cl.
*H04W 24/08* (2009.01)
*H04W 76/27* (2018.01)

(52) U.S. Cl.
CPC ........... *H04W 24/08* (2013.01); *H04W 76/27* (2018.02)

(58) Field of Classification Search
CPC ..... H04W 24/08; H04W 76/27; H04W 24/10; H04W 36/0094; H04W 24/02; H04W 52/0216; H04W 52/0258; H04B 7/0695; H04B 17/309; H04B 17/318; H04B 17/382; H04L 5/0051

See application file for complete search history.

(56) References Cited

U.S. PATENT DOCUMENTS

| | | | | |
|---|---|---|---|---|
| 2015/0350976 A1* | 12/2015 | Kodali | .................. | H04W 76/28 455/440 |
| 2019/0335317 A1* | 10/2019 | Zhou | ..................... | H04W 48/20 |
| 2020/0314816 A1* | 10/2020 | Yi | ......................... | H04L 5/0094 |

(Continued)

FOREIGN PATENT DOCUMENTS

| | | |
|---|---|---|
| CN | 114503643 A | 5/2022 |
| CN | 114514769 A | 5/2022 |

(Continued)

OTHER PUBLICATIONS

Ericsson (Email Rapporteur): "[98#52] [NB-IoT] Power Consumption for RRM", 3GPP Draft, 3GPP TSG-RAN2 Meeting #99, R2-1708277 Email Report 98_52 Power Consumption for RRM, 3rd Generation Partnership Project (3GPP), Mobile Competence Centre, 650, Route Des Lucioles, F-06921 Sophia-Antipolis Cedex, FR, vol. RAN WG2, No. Berlin, Germany, Aug. 21, 2017-Aug. 25, 2017 Aug. 20, 2017 (Aug. 20, 2017), XP051318174, pp. 1-12, Retrieved from the Internet: URL:http://www.3gpp.org/ftp/Meetings_3GPP_SYNC/RAN2/Docs/ [retrieved on Aug. 20, 2017] p. 9-p. 10, the whole document.

(Continued)

*Primary Examiner* — Sun Jong Kim
(74) *Attorney, Agent, or Firm* — Harrity & Harrity, LLP (57) ABSTRACT

A user equipment (UE) may receive, from a network entity, a configuration associated with radio resource management (RRM) measurement relaxation based at least in part on the UE being stationary. The UE may perform RRM measurements based at least in part on the configuration associated with RRM measurement relaxation.

30 Claims, 5 Drawing Sheets

(56) References Cited

U.S. PATENT DOCUMENTS

| | | | |
|---|---|---|---|
| 2021/0076275 A1 | 3/2021 | Yiu et al. | |
| 2021/0105643 A1* | 4/2021 | Kim | H04W 48/16 |
| 2021/0400589 A1* | 12/2021 | Yiu | H04W 36/0088 |
| 2022/0070706 A1* | 3/2022 | Kusashima | H04W 48/20 |
| 2022/0232471 A1* | 7/2022 | Laselva | H04W 24/10 |
| 2022/0264384 A1 | 8/2022 | Lee et al. | |
| 2024/0073729 A1* | 2/2024 | Hu | H04W 24/10 |

FOREIGN PATENT DOCUMENTS

| | | |
|---|---|---|
| WO | WO-2020069155 A2 | 4/2020 |
| WO | WO-2020089513 A1 | 5/2020 |
| WO | WO-2021226028 A1 | 11/2021 |

OTHER PUBLICATIONS

International Search Report and Written Opinion—PCT/US2022/070686—ISA/EPO—May 9, 2022.

Qualcomm Incorporated: "RRM Relaxations for RedCap UEs", 3GPP Draft, R2-2107218, 3GPP TSG-RAN WG2 Meeting #115-e, 3rd Generation Partnership Project (3GPP), Mobile Competence Centre, 650, Route Des Lucioles, F-06921, Sophia-Antipolis Cedex, France, vol. RAN WG2, No. Online, Aug. 16, 2021-Aug. 27, 2021, Aug. 6, 2021 (Aug. 6, 2021), XP052033964, pp. 1-4, Retrieved from the Internet: URL: https://ftp.3gpp.org/tsg_ran/WG2_RL2/TSGR2_115-e/Docs/R2-2107218.zip R2-2107218_RRM relaxations for RedCapUEs.docx [retrieved on Aug. 6, 2021] the whole document.

3GPP: "3rd Generation Partnership Project, Technical Specification Group Radio Access Network, Study on Support of Reduced Capability NR Devices(Release 17)", 3GPP TR 38.875 V1.1.0, Mar. 2021, R1-2102270, 136 Pages.

Ericsson: "Further Evaluations of RRM Relaxation", 3GPP TSG-RAN WG2 #113e, Tdoc R2-2100987, Electronic meeting, Jan. 25, 2021-Feb. 5, 2021, pp. 1-10.

Huawei., et al., "RRM Measurement Relaxation for Redcap UE", 3GPP TSG-RAN WG2 Meeting #111 electronic, R2-2007347, Online, Aug. 17-Aug. 28, 2020, pp. 1-4.

Samsung: "RRM Relaxation for RedCap Devices", 3GPP TSG-RAN WG2 Meeting #113-e, R2-2101877, 3rd Generation Partnership Project, Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021, 4 Pages.

* cited by examiner

RADIO RESOURCE MANAGEMENT MEASUREMENT RELAXATION FOR STATIONARY USER EQUIPMENTS

CROSS-REFERENCE TO RELATED APPLICATION

This Patent Application claims priority to U.S. Provisional Patent Application No. 63/166,514, filed on Mar. 26, 2021, entitled "RADIO RESOURCE MANAGEMENT MEASUREMENT RELAXATION FOR STATIONARY USER EQUIPMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio resource management (RRM) measurement relaxation for stationary user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a network entity, a configuration associated with radio resource management (RRM) measurement relaxation based at least in part on the UE being stationary; and performing RRM measurements based at least in part on the configuration associated with RRM measurement relaxation.

In some aspects, a UE for wireless communication includes a memory and one or more processors, coupled to the memory, configured to: receive, from a network entity, a configuration associated with RRM measurement relaxation based at least in part on the UE being stationary; and perform RRM measurements based at least in part on the configuration associated with RRM measurement relaxation.

In some aspects, a non-transitory computer-readable medium storing a set of instructions for wireless communication includes one or more instructions that, when executed by one or more processors of a UE, cause the UE to: receive, from a network entity, a configuration associated with RRM measurement relaxation based at least in part on the UE being stationary; and perform RRM measurements based at least in part on the configuration associated with RRM measurement relaxation.

In some aspects, an apparatus for wireless communication includes means for receiving, from a network entity, a configuration associated with RRM measurement relaxation based at least in part on the apparatus being stationary; and means for performing RRM measurements based at least in part on the configuration associated with RRM measurement relaxation.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
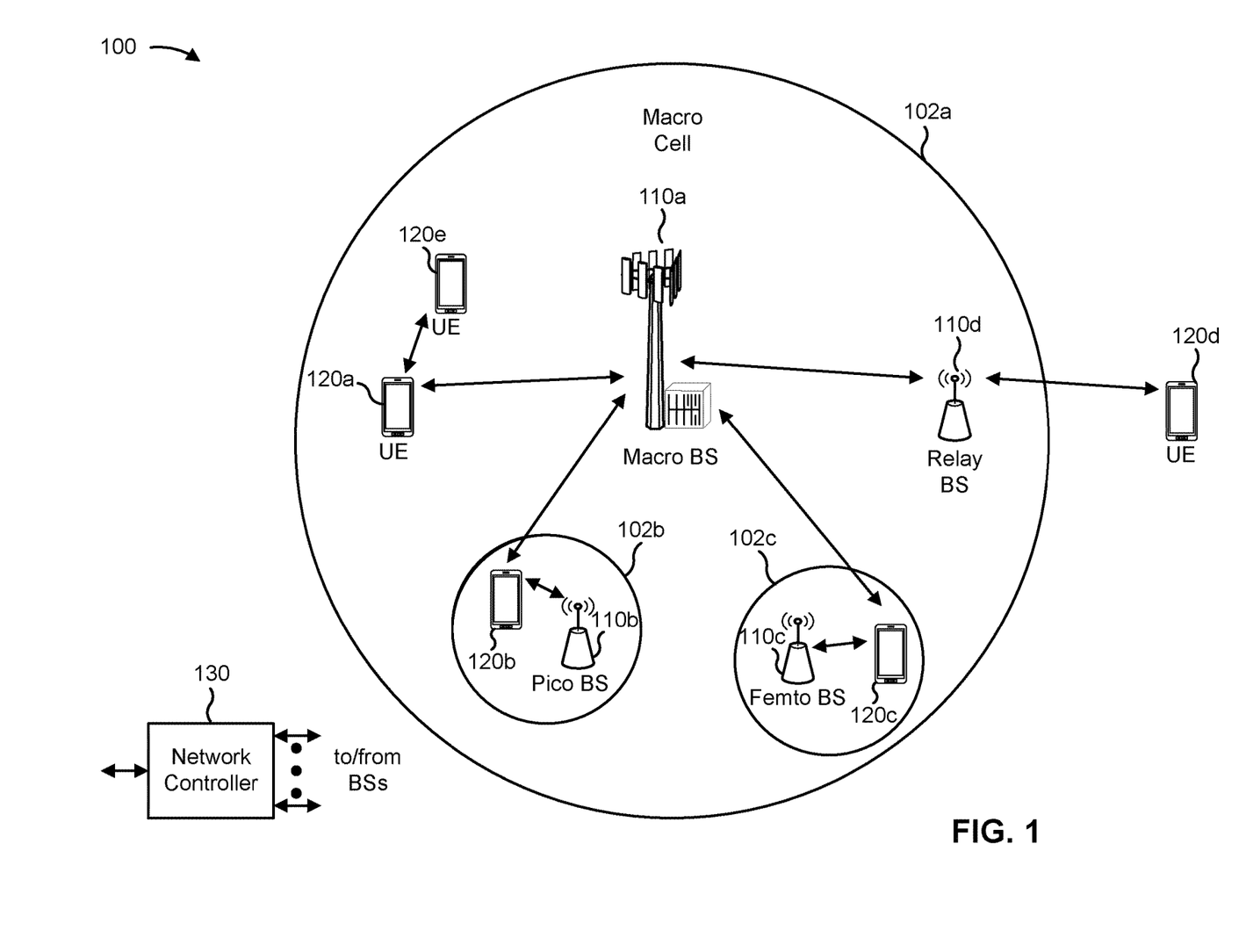
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
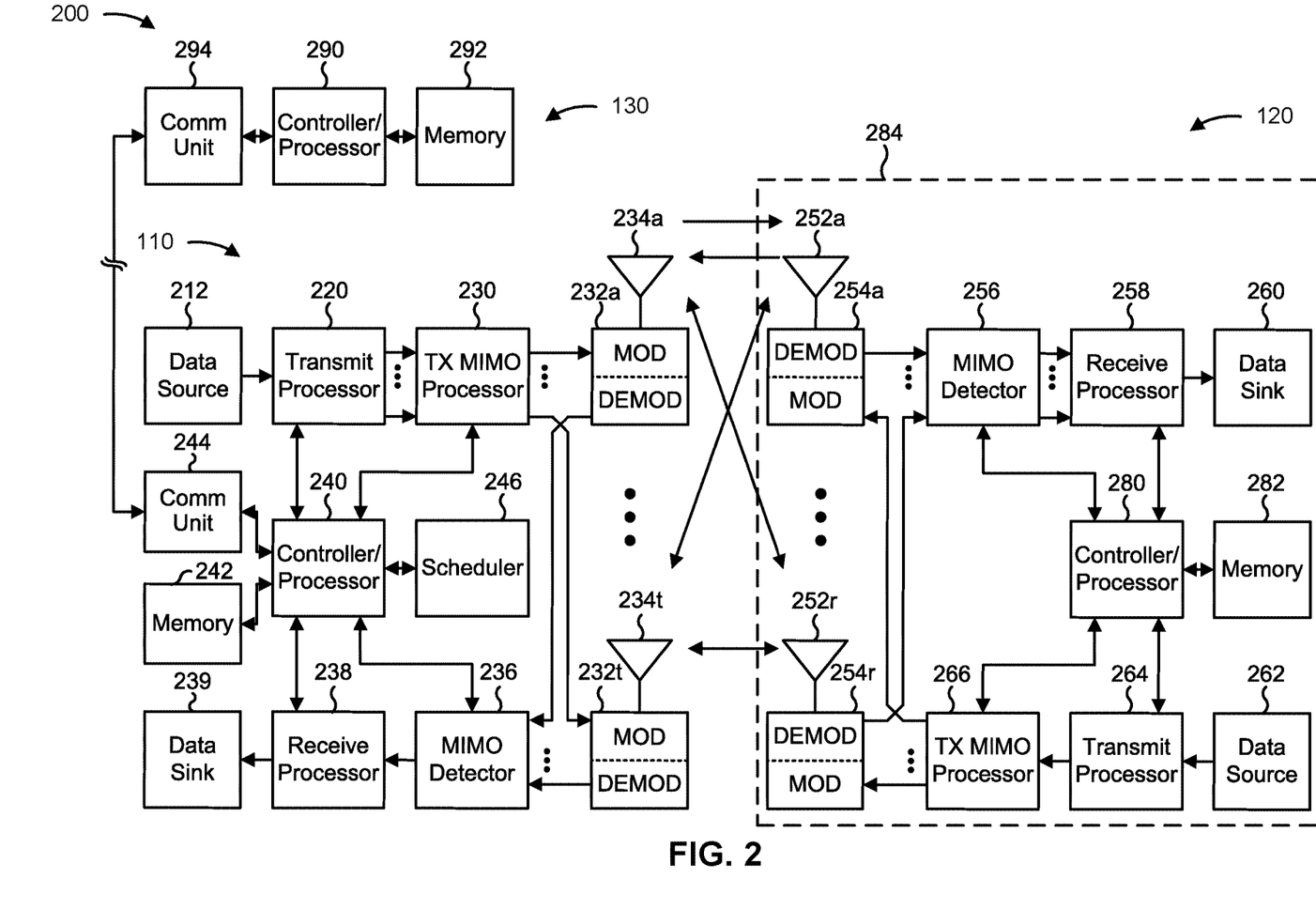
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-4).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-4).

The controller/processor 240 of the base station 110, the controller/processor 280 of the UE 120, and/or any other component(s) of FIG. 2 may perform one or more techniques associated with radio resource management (RRM) measurement relaxation for stationary UEs, as described in more detail elsewhere herein. For example, the controller/processor 240 of the base station 110, the controller/processor 280 of the UE 120, and/or any other component(s) of FIG. 2 may perform or direct operations of, for example, process 300 of FIG. 3, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 300 of FIG. 3, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a configuration associated with RRM measurement relaxation based at least in part on the UE being stationary; and/or means for performing RRM measurements based at least in part on the configuration associated with RRM measurement relaxation. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Two triggering criteria may be defined for RRM relaxation, which may involve reducing an interval between RRM measurements to increase power savings at a UE. A first triggering criterion may involve low mobility. The UE may be considered to be low mobility when a difference between a reference signal level (e.g., SrxlevRef) and a serving cell received signal level (e.g., Srxlev) is less than a delta value (e.g., SSearchDeltaP) for a period of time (e.g., TSearchDeltaP). The serving cell received signal level may indicate a radio link quality of the UE. A second triggering criterion may involve not being at a cell edge (e.g., the UE is not located at a cell edge). The UE may be considered to not be at the cell edge when the serving cell received signal level (e.g., Srxlev) is greater than a first power threshold (e.g., SSearchThresholdP), and a signal quality (e.g., Squal) is greater than a second power threshold (e.g., SSearchThresholdQ) when the second power threshold is configured.

A network entity (e.g., a base station) may configure the first triggering criterion and/or the second triggering criterion for the UE to determine whether to trigger the RRM relaxation. When both the first triggering criterion and the second triggering criterion are configured for the UE, the network entity may further configure whether the UE needs to meet only one triggering criterion or both of the triggering criteria to perform the RRM relaxation. In other words, the network entity may further configure whether the UE is to be low mobility and/or not located at the cell edge in order to relax RRM measurements.

The RRM relaxation may include two types of RRM relaxation techniques, depending on the triggering criteria met by the UE. A first type of RRM relaxation may involve increasing an interval (or scaling factor) between RRM measurements, which may result in power savings at the UE. A second type of RRM relaxation may involve temporarily stopping RRM measurements (e.g., for one hour) to save power at the UE. Depending on the triggering criteria met by the UE, the UE may apply the first type of RRM relaxation or the second type of RRM relaxation.

When only the first triggering criterion for low mobility is configured, the first type of RRM relaxation (e.g., increasing the interval or scaling factor between RRM measurements) may be applied for RRM measurements including intra-frequency measurements, inter-frequency measurements of equal or lower priority, and/or inter-RAT measurements. When only the second triggering criterion for not-at-cell-edge is configured, the first type of RRM relaxation may be applied for RRM measurements including intra-frequency measurements, inter-frequency measurements of equal or lower priority, and/or inter-RAT measurements.

When only the first triggering criterion for low mobility is configured, the second type of RRM relaxation (e.g., stopping RRM measurements for a period of time) may be applied for RRM measurements including high priority inter-frequency and inter-RAT measurements, but only when a condition is met. The condition may involve the serving cell received signal level (e.g., Srxlev) being greater than a first threshold (e.g., SnonIntraSearchP) and a signal quality being greater than a second threshold (e.g., SnonIntraSearchQ). Otherwise, the first type of RRM relaxation may be applied.

When only the second triggering criterion for not-at-cell-edge is configured, no RRM relaxation may be available for RRM measurements including high priority inter-frequency and inter-RAT measurements when the condition is met. Otherwise, the first type of RRM relaxation may be applied.

When both the first triggering criterion and the second triggering criterion are configured and either triggering criterion is met, the first type of RRM relaxation may be applied for RRM measurements including intra-frequency measurements, inter-frequency measurements of equal or lower priority, and/or inter-RAT measurements. When both the first triggering criterion and the second triggering criterion are configured and either triggering criterion is met, no RRM relaxation may be available for RRM measurements including high priority inter-frequency and inter-RAT measurements when the condition is met. Otherwise, the first type of RRM relaxation may be applied.

When both the first triggering criterion and the second triggering criterion are configured and both triggering criteria are met, the second type of RRM relaxation may be applied for RRM measurements including intra-frequency measurements, inter-frequency measurements of equal or lower priority, and/or inter-RAT measurements. When both the first triggering criterion and the second triggering criterion are configured and both triggering criteria are met, the second type of RRM relaxation may be applied for RRM measurements including high priority inter-frequency and inter-RAT measurements.

However, prior RRM relaxation approaches do not consider UEs that are stationary. Stationary UEs have different characteristics as compared to low mobility UEs. For example, stationary UEs have less uncertainties with respect to mobility as compared to low mobility UEs. Further, stationary UEs have less fluctuations in link quality due to immobility as compared to low mobility UEs. Thus, the prior RRM relaxation approaches and corresponding parameters (or thresholds) are not well suited for stationary UEs. The prior RRM relaxation approaches may be insufficient in relaxing the RRM measurements. In other words, the prior RRM relaxation approaches may be insufficient in relaxing the RRM measurements to a fullest capability because the prior RRM relaxation approaches are designed for low mobility UEs and not stationary UEs.

In various aspects of techniques and apparatuses described herein, a UE may receive, from a network entity, a first configuration associated with RRM measurement relaxation based at least in part on the UE being stationary. The UE may be associated with a fixed location, as indicated in a subscription associated with the UE. The UE may be stationary based at least in part on a signal strength of the UE satisfying a threshold value over a period of time, where the threshold value may be specific to stationary UEs. In some aspects, the UE may receive, from the network entity, a second configuration associated with RRM measurement relaxation based at least in part on the UE being not located at a cell edge. The UE may not be located at the cell edge based at least in part on a signal strength of the UE satisfying a threshold value, where the threshold value may be specific to stationary UEs. The UE may perform RRM measurements based at least in part on the first configuration and/or the second configuration associated with the RRM measurement relaxation.

In various aspects of techniques and apparatuses described herein, the UE may perform the RRM measurements based at least in part on a scaling factor associated with an interval of the RRM measurements, where the scaling factor may be based at least in part on the UE being stationary and the UE being located at a cell edge. The scaling factor associated with the RRM measurements may be different for a UE that is stationary as compared to a scaling factor associated with the RRM measurements for a UE having low mobility. Alternatively, the UE may stop the RRM measurements for a period of time based at least in part on the UE being stationary and the UE being not located at a cell edge. As a result, the UE may utilize the first configuration and/or the second configuration to maximize a level of RRM measurement relaxation based on a stationary state of the UE, thereby maximizing an amount of power saved at the UE.

Figure 3:
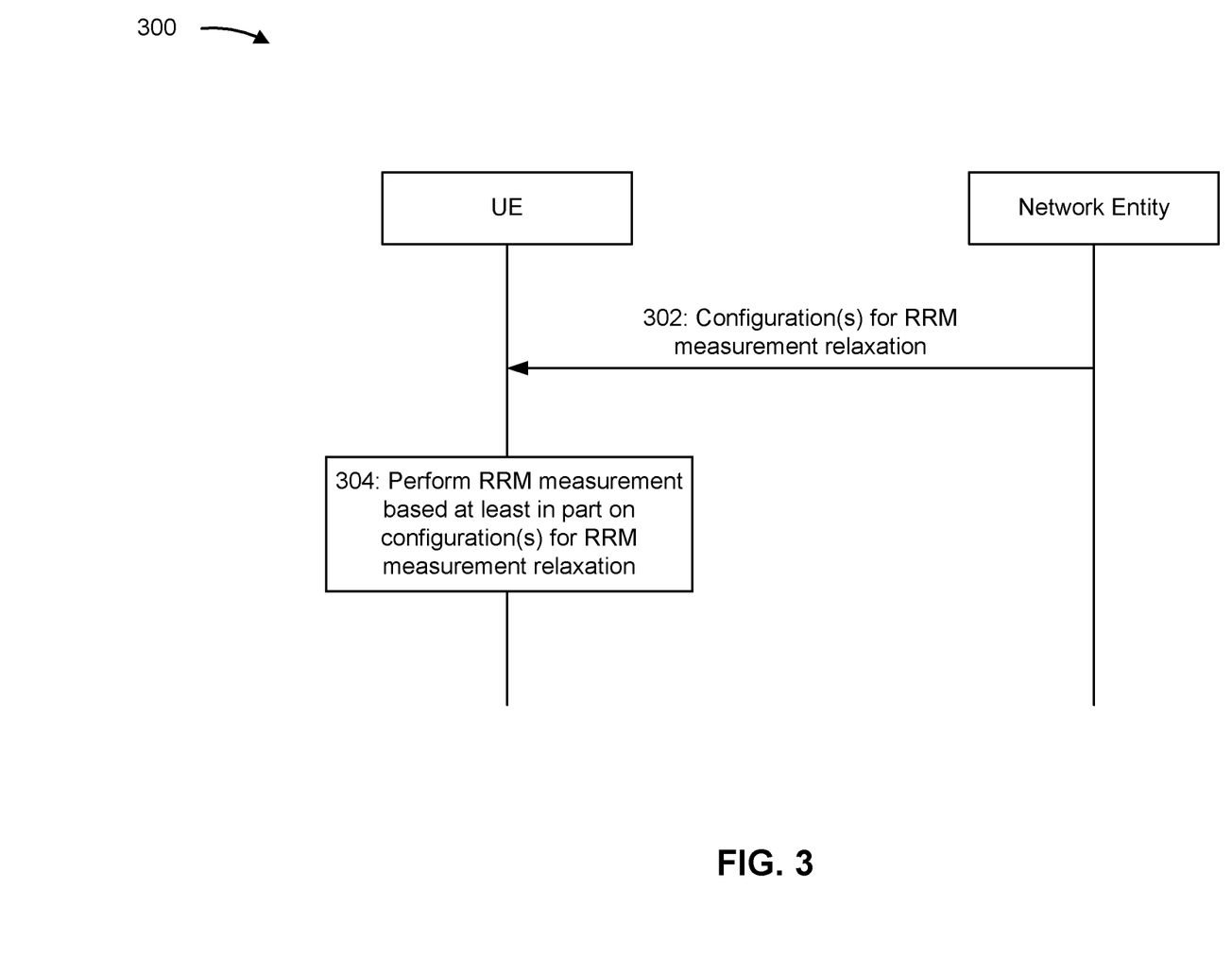
FIG. 3 is a diagram illustrating an example associated with radio resource management (RRM) measurement relaxation for stationary UEs, in accordance with the present disclosure.

FIG. 3 is a diagram illustrating an example 300 associated with RRM measurement relaxation for stationary UEs, in accordance with the present disclosure. As shown in FIG. 3, example 300 includes communication between a UE (e.g., UE 120) and a network entity (e.g., base station 110). In some aspects, the UE and the network entity may be included in a wireless network such as wireless network 100.

In some aspects, RRM measurement relaxation may involve relaxing RRM measurements at a UE for power saving. The RRM measurement relaxation may involve reducing an interval between RRM measurements, thereby resulting in fewer RRM measurements and more power saving. The RRM measurement relaxation may also involve temporarily stopping RRM measurements for a period of time, thereby resulting in power savings at the UE. The RRM measurements may include intra-frequency measurements, inter-frequency measurements, and/or inter-RAT measurements.

In some aspects, the RRM measurement relaxation may occur when the UE is in a radio resource control (RRC) idle state or inactive state. In some aspects, the UE may be a reduced capability UE or a non-reduced capability UE.

In some aspects, the UE may be a stationary UE. A stationary UE may be associated with a fixed location. In other words, a mobility property of a stationary UE does not change throughout a deployment of the stationary UE. The fixed location associated with the stationary UE may be determined after the deployment of the stationary UE. For example, information indicating a stationary state of the UE may be provisioned into a subscription associated with the UE. In other words, a subscriber identification module (SIM) card associated with the stationary UE may indicate that the UE is stationary.

In some aspects, a serving cell received signal level (e.g., Srxlev) of a stationary UE may fluctuate based at least in part on a channel quality of a link associated with the stationary UE. However, the fluctuation may be less than that of a low mobility UE or a mobile UE, since link measurements used in deriving the serving cell received signal level may be layer 3 (L3) filtered over different beams and over time. As a result, a mobility of the stationary UE may not be evaluated when determining whether to apply RRM measurement relaxation.

In some aspects, a stationary UE may be stationary, as the UE may still move from time to time. In this case, the mobility of the stationary UE may be evaluated against stationary criteria when determining whether to apply RRM measurement relaxation. A UE may be considered to be stationary when a difference between a threshold value (e.g., Srxlevstationary) and a serving cell received signal level (e.g., Srxlev) is less than a delta value (e.g., SSearchDeltaP_stationary) for a period of time (e.g., TSearchDeltaP_stationary). The SSearchDeltaP_stationary parameter may be smaller than a SSearchDeltaP parameter used to evaluate low mobility UEs, and the TSearchDeltaP_stationary parameter may be longer than a TSearchDeltaP parameter used to evaluate low mobility UEs.

As shown by reference number 302, the UE may receive, from the network entity, one or more configurations associated with RRM measurement relaxation. The UE may receive the one or more configurations based at least in part on the UE being stationary. In other words, the UE may receive the one or more configurations based at least in part on the UE having a fixed location or being stationary. The UE may be stationary when the UE is associated with the fixed location, which may be indicated in a subscription associated with the UE. The UE may be stationary based at least in part on a signal strength (e.g., Srxlev) satisfying a threshold value (e.g., SSearchDeltaP_stationary) over a period of time (e.g., TSearchDeltaP_stationary), where the threshold value may be specific to stationary UEs. In other words, when this stationary criterion is satisfied, the UE may be considered to be stationary.

In some aspects, the UE may receive a first configuration associated with RRM measurement relaxation based at least in part on the UE being stationary. Further, the UE may receive a second configuration associated with RRM measurement relaxation, from the network entity, based at least in part on the UE being not located at a cell edge.

In some aspects, stationary UEs may have separate RRM measurement relaxation configurations for fixed-location UEs versus stationary UEs, since characteristics of fixed-location UEs may be different than characteristics of stationary UEs. In other words, the first configuration associated with RRM measurement relaxation based at least in part on the UE being stationary may further be divided into a first sub-configuration for fixed location UEs and/or a second sub-configuration for stationary UEs.

In some aspects, the network entity may individually enable and/or disable RRM measurement relaxation for fixed-location and/or stationary UEs. When RRM measurement relaxation for stationary UEs is enabled, the network entity may additionally configure not-at-cell-edge criteria. For example, the UE may receive, from the network entity, indication(s) to enable or disable the first configuration and/or the second configuration associated with RRM measurement relaxation.

In some aspects, the second configuration associated with RRM measurement relaxation for not-at-cell-edge UEs may be applicable when the first configuration associated with RRM measurement relaxation for stationary UEs is enabled. In some cases, the second configuration may only be applicable when the first configuration is enabled. The second configuration may allow stationary UEs at a cell center to have different RRM measurement relaxation as compared to stationary UEs at a cell edge. However, the second configuration may not be a standalone configuration. In other words, the second configuration associated with RRM measurement relaxation for not-at-cell-edge UEs may not be enabled when the first configuration associated with RRM measurement relaxation for stationary UEs is disabled (e.g., no standalone not-at-cell-edge criteria in which stationary RRM measurement relaxation is disabled but not-at-cell-edge RRM measurement relaxation is enabled).

In some aspects, the UE may not be located at the cell edge based at least in part on a signal strength of the UE (e.g., Srxlev) satisfying a threshold value (e.g., SSearchThresholdP_stationary), and the threshold value may be specific to stationary UEs.

Since stationary UEs (either fixed-location UEs or temporarily stationary UEs) have less uncertainties in mobility as compared to low mobility UEs, a not-at-cell-edge criterion for stationary UEs may be different than criteria used for low mobility UEs. Further, unlike with low mobility UEs, the not-at-cell-edge criterion may be configured only when a stationary criterion is configured, where the stationary criterion may be used to determine whether the UE is stationary (e.g., associated with a fixed location or is temporarily stationary). In some aspects, a stationary UE may be considered to be not at a cell edge when a serving cell received signal level (e.g., Srxlev) is greater than a first threshold value (e.g., SSearchThresholdP_stationary) and a signal quality (e.g., Squat) is greater than a second threshold value (e.g., SSearchThresholdQ_stationary), when the second threshold value is configured. In other words, when this not-at-cell-edge criterion is satisfied, the UE may be considered to not be at the cell edge.

As shown by reference number 304, the UE may perform RRM measurements based at least in part on the one or more configurations associated with RRM measurement relaxation. For example, the UE may perform RRM measurements based at least in part on the first configuration associated with RRM measurement relaxation based at least in part on the UE being stationary, which may further include a first sub-configuration when the UE has a fixed location and/or a second sub-configuration when the UE is stationary. Additionally, the UE may perform RRM measurements based at least in part on the second configuration associated with RRM measurement relaxation, based at least in part on the UE not being located at a cell edge. In other words, the UE may perform the RRM measurements based at least in part on the first configuration and the second configuration, or the UE may perform the RRM measurements based at least in part on only the first configuration.

In some aspects, the UE may perform the RRM measurements with the RRM measurement relaxation based at least in part on a scaling factor associated with an interval of the RRM measurements. The scaling factor may be based at least in part on the UE being stationary and the UE being located at a cell edge. The scaling factor associated with the RRM measurements may be different for a UE that is stationary as compared to a scaling factor associated with the RRM measurements for a UE having low mobility. In some aspects, the UE may perform the RRM measurements with the RRM measurement relaxation by stopping the RRM measurements for a period of time based at least in part on the UE being stationary and the UE being not located at a cell edge.

In some aspects, stationary UEs may have less fluctuations in link quality as compared to low mobility UEs, so more RRM measurement relaxation may be applied for stationary UEs as compared to low mobility UEs. As a result, RRM measurement relaxation may have separate parameters and triggers for stationary UEs as compared to low mobility UEs.

In some aspects, when a UE satisfies the stationary criterion (e.g., the UE satisfies the stationary criterion for either a fixed-location UE or for a temporarily stationary UE, as indicated in the first configuration), and not-at-cell-edge criterion is not enabled or the UE does not meet the not-at-cell-edge criterion (e.g., as indicated in the second configuration), the UE may relax RRM measurements. For example, the UE may relax intra-frequency measurements, inter-frequency measurements of equal or lower priority, and/or inter-RAT measurements with a longer interval (e.g., an adjusted scaling factor). Further, the UE may relax inter-frequency measurements of higher priority and inter-RAT measurements with a longer interval (e.g., an adjusted scaling factor) when a serving cell received signal level (e.g., Srxlev) is less than a first threshold value (e.g., SnonIntraSearchP) and a signal quality (e.g., Squal) is less than a second threshold value (e.g., SnonIntraSearchQ). Otherwise, the UE may stop these RRM measurements for a configured duration. In some aspects, when the UE is considered to be not at a cell edge, the UE may stop neighbor-cell RRM measurements for a configured duration. Further, a scaling factor for the relaxed RRM measurements and a duration for stopped measurements may be different for stationary UEs as compared to low mobility UEs.

In some aspects, the RRM measurement relaxation may occur when the UE is in an RRC connected mode.

In some aspects, the UE may perform the RRM measurements with the RRM measurement relaxation based at least in part on parameters that are specific to a mode of the UE, where the mode may be an RRC idle mode or an RRC connected mode.

In some aspects, when the UE is in an RRC connected mode, the UE may perform the RRM measurements similarly to when the UE performs RRM measurements when in an RRC idle mode. Therefore, the first configuration for RRM measurement relaxation for stationary UEs and the second configuration for RRM measurement for not-at-cell-edge UEs may also be applicable when the UE is in the RRC connected mode. However, since timing requirements for cell reselection in the RRC connected mode may be different than timing requirements during the RRC idle mode, the network entity may configure different parameters (e.g., SSearchDeltaP, TSearchDeltaP_stationary, and/or SSearch-ThresholdP_stationary) used to trigger the RRM measurement relaxation with respect to the RRC idle mode versus the RRC connected mode. Further, the network entity may configure a different scaling factor for an RRM measurement interval for the RRC idle mode versus the RRC connected mode. In other words, parameters associated with the stationary criterion and/or the not-at-cell-edge criterion may vary based at least in part on whether the UE is in the RRC idle mode or in the RRC connected mode.

In some aspects, the UE may receive, from the network entity, the one or more configurations for RRM measurement relaxation via dedicated signaling or via broadcast signaling. When the UE is in the RRC connected mode, the RRM measurement relaxation may be enabled via broadcast signaling or dedicated signaling. As an example, the network entity may enable RRM measurement relaxation for a certain class of UEs but not for all UEs in a cell, so in this case, the network entity may use dedicated signaling. As another example, the network entity may configure a fewer number of measurement objects after RRM measurement relaxation is triggered, and a reduction in measurement objects may be supported by dedicated signaling.

In some aspects, the UE may transmit, to the network entity, capability signaling that indicates a capability of the UE. The UE may receive the one or more configurations for RRM measurement relaxation based at least in part on the capability signaling. For example, the UE may indicate its stationary state to the network entity, which may enable the network entity to transmit the one or more configurations for RRM measurement relaxation via dedicated signaling. A UE having a fixed location may determine the fixed location based at least in part on a subscription associated with the UE, and the UE may indicate the fixed location to the network entity via the capability signaling. When the UE enters the RRC connected mode, the network entity may directly configure the UE with a neighbor cell RRM measurement configuration, which may be more relaxed than for non-stationary UEs. Further, the network entity may configure the not-at-cell-edge criterion for the UE, and if the UE satisfies the not-at-cell-edge criterion, the UE may autonomously stop neighbor cell RRM measurements for a configuration duration.

In some aspects, the UE may transmit, to the network entity, UE assistance information that indicates a request for the one or more configurations for RRM measurement relaxation. For example, for a stationary UE, when RRM measurement relaxation for stationary UEs is not advertised in a system information block (SIB), the stationary UE may use the UE assistance information to request the one or more configurations for RRM measurement relaxation. The stationary UE may send the request after determining that the UE will be stationary at an upcoming time. The network entity may provide the UE with the one or more configurations for RRM measurement relaxation. The stationary UE may stop relaxed RRM measurements at an end of a preset duration (e.g., one hour) or after criteria for being stationary are no longer met.

In some aspects, the UE may receive the one or more configurations for RRM measurement relaxation via a SIB while the UE is operating in an RRC connected mode. The UE may perform the RRM measurements autonomously based at least in part on the one or more configurations for RRM measurement relaxation. For example, when RRM measurement relaxation is configured via broadcast, the network entity may advertise RRM measurement relaxation triggering criteria and parameters in the SIB, similar to when the UE is in the RRC idle mode. The UE may autonomously determine when to trigger the RRM measurement relaxation for neighbor cell RRM measurements based at least in part on link quality measurements. Further, the UE may determine which type of RRM measurement relaxation to apply (e.g., adjusting a scaling factor or temporarily stopping the RRM measurements).

In some aspects, the network entity may advertise the one or more configurations for RRM measurement relaxation in a cell. The one or more configurations may include a first configuration for stationary UEs (e.g., which may include fixed-location UEs and/or temporarily stationary UEs), a second configuration for low mobility UEs, and/or a third configuration for not-at-cell-edge UEs. Depending on whether the UE meets stationary criteria, not-at-cell-edge criteria, and/or low mobility criteria, the UE may apply one or more of the configurations for RRM measurement relaxation.

As indicated above, FIG. 3 is provided as an example. Other examples may differ from what is described with regard to FIG. 3.

Figure 4:
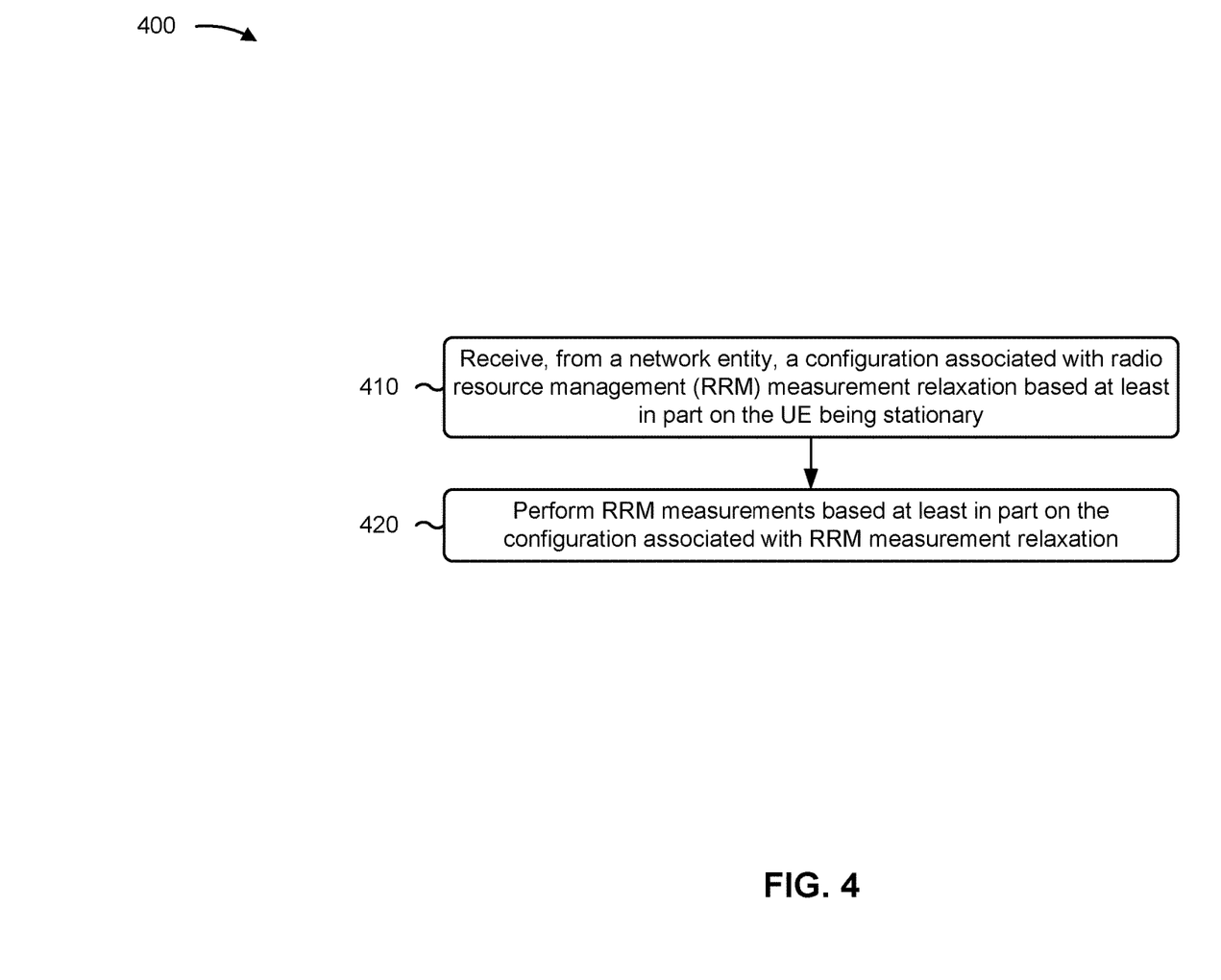
FIG. 4 is a diagram illustrating an example process associated with RRM measurement relaxation for stationary UEs, in accordance with the present disclosure.

FIG. 4 is a diagram illustrating an example process 400 performed, for example, by a UE, in accordance with the present disclosure. Example process 400 is an example where the UE (e.g., UE 120) performs operations associated with RRM measurement relaxation for stationary UEs.

As shown in FIG. 4, in some aspects, process 400 may include receiving, from a network entity, a configuration associated with RRM measurement relaxation based at least in part on the UE being stationary (block 410). For example, the UE (e.g., using reception component 502, depicted in FIG. 5) may receive, from a network entity, a configuration associated with RRM measurement relaxation based at least in part on the UE being stationary, as described above.

As further shown in FIG. 4, in some aspects, process 400 may include performing RRM measurements based at least in part on the configuration associated with RRM measurement relaxation (block 420). For example, the UE (e.g., using measurement component 508, depicted in FIG. 5) may perform RRM measurements based at least in part on the configuration associated with RRM measurement relaxation, as described above.

Process 400 may include additional aspects, such as any single aspect or any combination of aspects described below and/or in connection with one or more other processes described elsewhere herein.

In a first aspect, the UE that is stationary is associated with a fixed location, as indicated in a subscription associated with the UE.

In a second aspect, alone or in combination with the first aspect, the UE that is stationary is stationary based at least in part on a signal strength of the UE satisfying a threshold value over a period of time, wherein the threshold value is specific to stationary UEs.

In a third aspect, alone or in combination with one or more of the first and second aspects, the configuration associated with RRM measurement relaxation is applied when the UE is in a radio resource control idle mode.

In a fourth aspect, alone or in combination with one or more of the first through third aspects, process 400 includes receiving, from the network entity, an indication that the UE should disable the configuration associated with the RRM measurement relaxation.

In a fifth aspect, alone or in combination with one or more of the first through fourth aspects, the configuration is a first configuration, and process 400 includes receiving, from the network entity, a second configuration associated with RRM measurement relaxation based at least in part on the UE being not located at a cell edge, wherein the UE is not located at the cell edge based at least in part on a signal strength of the UE satisfying a threshold value, and wherein the threshold value is specific to stationary UEs.

In a sixth aspect, alone or in combination with one or more of the first through fifth aspects, performing the RRM measurements based at least in part on the configuration associated with RRM measurement relaxation comprises performing the RRM measurements based at least in part on a scaling factor associated with an interval of the RRM measurements, wherein the scaling factor is based at least in part on the UE being stationary and the UE being located at a cell edge.

In a seventh aspect, alone or in combination with one or more of the first through sixth aspects, the scaling factor associated with the RRM measurements is different for the UE that is stationary as compared to a scaling factor associated with the RRM measurements for a UE having low mobility.

In an eighth aspect, alone or in combination with one or more of the first through seventh aspects, performing the RRM measurements based at least in part on the configuration associated with RRM measurement relaxation comprises stopping the RRM measurements for a period of time based at least in part on the UE being stationary and the UE being not located at a cell edge.

In a ninth aspect, alone or in combination with one or more of the first through eighth aspects, the RRM measurements include one or more of intra-frequency measurements, inter-frequency measurements, or inter-radio access technology measurements.

In a tenth aspect, alone or in combination with one or more of the first through ninth aspects, the configuration associated with RRM measurement relaxation is applied when the UE is in a radio resource control connected mode.

In an eleventh aspect, alone or in combination with one or more of the first through tenth aspects, performing the RRM measurements based at least in part on the configuration associated with RRM measurement relaxation comprises performing the RRM measurements based at least in part on parameters that are specific to a mode of the UE, wherein the mode is one of a radio resource control idle mode or a radio resource control connected mode.

In a twelfth aspect, alone or in combination with one or more of the first through eleventh aspects, receiving the configuration comprises receiving the configuration via dedicated signaling or via broadcast signaling.

In a thirteenth aspect, alone or in combination with one or more of the first through twelfth aspects, process 400 includes transmitting, to the network entity, capability signaling that indicates a capability of the UE, and the receiving the configuration comprises receiving the configuration based at least in part on the capability signaling.

In a fourteenth aspect, alone or in combination with one or more of the first through thirteenth aspects, process 400 includes transmitting, to the network entity, UE assistance information that indicates a request for the configuration.

In a fifteenth aspect, alone or in combination with one or more of the first through fourteenth aspects, receiving the configuration comprises receiving the configuration via a system information block while the UE is operating in a radio resource control connected mode, and performing the RRM measurements comprises performing the RRM measurements autonomously based at least in part on the configuration received via the system information block.

In a sixteenth aspect, alone or in combination with one or more of the first through fifteenth aspects, the configuration is included in a plurality of configurations available from the network entity, wherein the plurality of configurations include a first configuration for stationary UEs, a second configuration for low mobility UEs, and a third configuration for not-at-cell-edge UEs.

In a seventeenth aspect, alone or in combination with one or more of the first through sixteenth aspects, the UE is a reduced capability UE.

In an eighteenth aspect, alone or in combination with one or more of the first through seventeenth aspects, the UE is a non-reduced capability UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
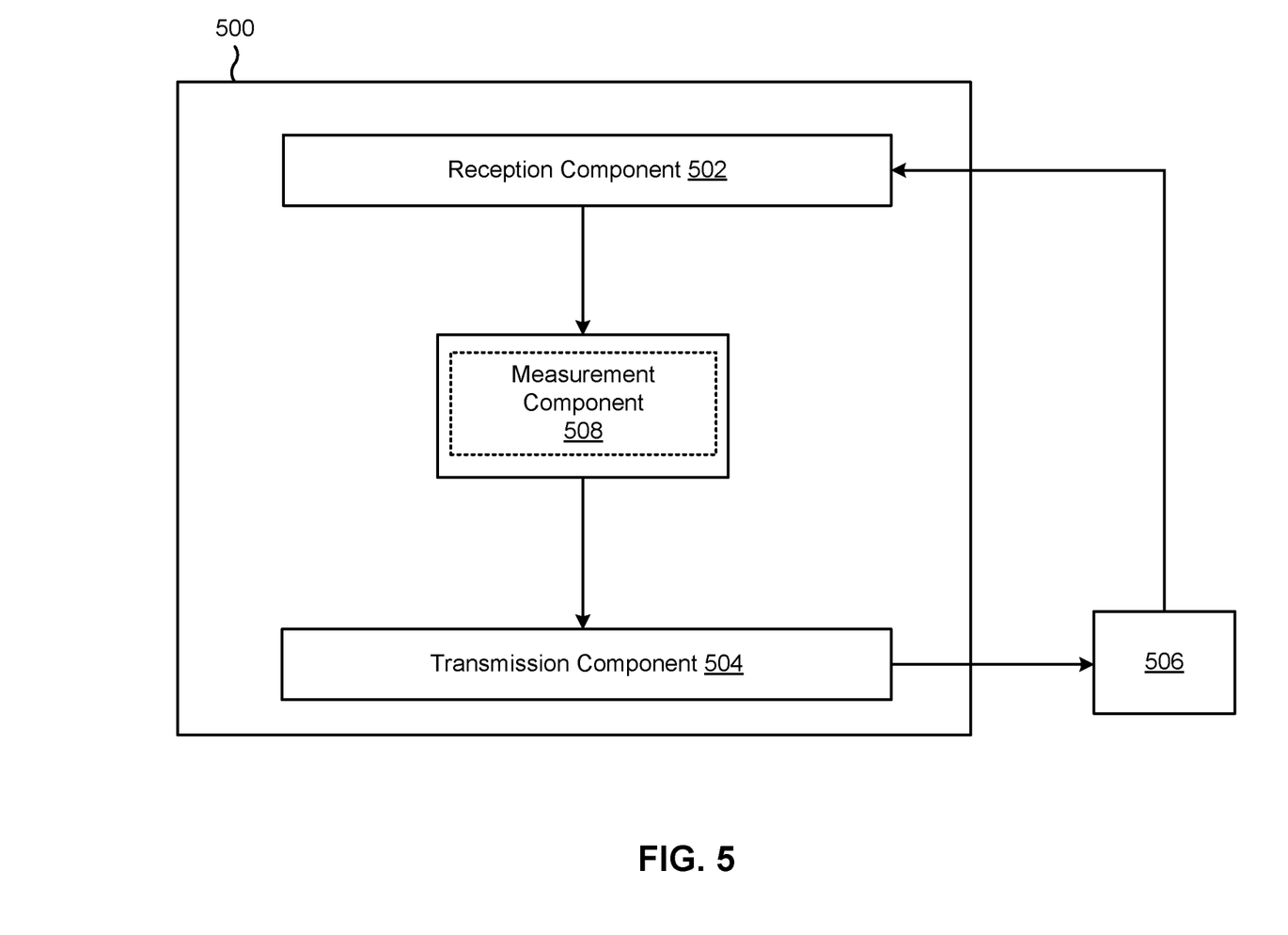
FIG. 5 is a block diagram of an example apparatus for wireless communication, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include a measurement component 508, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4, or a combination thereof. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The reception component 502 may receive, from a network entity, a configuration associated with RRM measurement relaxation based at least in part on the UE being stationary. The measurement component 508 may perform RRM measurements based at least in part on the configuration associated with RRM measurement relaxation.

The reception component 502 may receive, from the network entity, an indication that the UE should disable the configuration associated with the RRM measurement relaxation. The transmission component 504 may transmit, to the network entity, capability signaling that indicates a capability of the UE. The transmission component 504 may transmit, to the network entity, UE assistance information that indicates a request for the configuration. The reception component 502 may receive the configuration via a system information block while the UE is operating in a radio resource control connected mode. The measurement component 508 may perform the RRM measurements autonomously based at least in part on the configuration received via the system information block.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a user equipment (UE), comprising: receiving, from a network entity, a configuration associated with radio resource management (RRM) measurement relaxation based at least in part on the UE being stationary; and performing RRM measurements based at least in part on the configuration associated with RRM measurement relaxation.

Aspect 2: The method of Aspect 1, wherein the UE that is stationary is associated with a fixed location, as indicated in a subscription associated with the UE.

Aspect 3: The method of any of Aspects 1 through 2, wherein the UE that is stationary is stationary based at least in part on a signal strength of the UE satisfying a threshold value over a period of time, wherein the threshold value is specific to stationary UEs.

Aspect 4: The method of any of Aspects 1 through 3, wherein the configuration associated with RRM measurement relaxation is applied when the UE is in a radio resource control idle mode.

Aspect 5: The method of any of Aspects 1 through 4, further comprising: receiving, from the network entity, an indication that the UE should disable the configuration associated with the RRM measurement relaxation.

Aspect 6: The method of any of Aspects 1 through 5, wherein the configuration is a first configuration, and further comprising receiving, from the network entity, a second configuration associated with RRM measurement relaxation based at least in part on the UE being not located at a cell edge, wherein the UE is not located at the cell edge based at least in part on a signal strength of the UE satisfying a threshold value, and wherein the threshold value is specific to stationary UEs.

Aspect 7: The method of any of Aspects 1 through 6, wherein performing the RRM measurements based at least in part on the configuration associated with RRM measurement relaxation comprises performing the RRM measurements based at least in part on a scaling factor associated with an interval of the RRM measurements, wherein the scaling factor is based at least in part on the UE being stationary and the UE being located at a cell edge.

Aspect 8: The method of Aspect 7, wherein the scaling factor associated with the RRM measurements is different for the UE that is stationary as compared to a scaling factor associated with the RRM measurements for a UE having low mobility.

Aspect 9: The method of any of Aspects 1 through 8, wherein performing the RRM measurements based at least in part on the configuration associated with RRM measurement relaxation comprises stopping the RRM measurements for a period of time based at least in part on the UE being stationary and the UE being not located at a cell edge.

Aspect 10: The method of any of Aspects 1 through 9, wherein the RRM measurements include one or more of: intra-frequency measurements, inter-frequency measurements, or inter-radio access technology measurements.

Aspect 11: The method of any of Aspects 1 through 10, wherein the configuration associated with RRM measurement relaxation is applied when the UE is in a radio resource control connected mode.

Aspect 12: The method of any of Aspects 1 through 11, wherein performing the RRM measurements based at least in part on the configuration associated with RRM measurement relaxation comprises performing the RRM measurements based at least in part on parameters that are specific to a mode of the UE, wherein the mode is one of a radio resource control idle mode or a radio resource control connected mode.

Aspect 13: The method of any of Aspects 1 through 12, wherein receiving the configuration comprises receiving the configuration via dedicated signaling or via broadcast signaling.

Aspect 14: The method of any of Aspects 1 through 13, further comprising: transmitting, to the network entity, capability signaling that indicates a capability of the UE; and wherein the receiving the configuration comprises receiving the configuration based at least in part on the capability signaling. wherein the receiving the configuration comprises receiving the configuration based at least in part on the capability signaling.

Aspect 15: The method of any of Aspects 1 through 14, further comprising: transmitting, to the network entity, UE assistance information that indicates a request for the configuration.

Aspect 16: The method of any of Aspects 1 through 15, wherein: receiving the configuration comprises receiving the configuration via a system information block while the UE is operating in a radio resource control connected mode; and performing the RRM measurements comprises performing the RRM measurements autonomously based at least in part on the configuration received via the system information block.

Aspect 17: The method of any of Aspects 1 through 16, wherein the configuration is included in a plurality of configurations available from the network entity, wherein the plurality of configurations include a first configuration for stationary UEs, a second configuration for low mobility UEs, and a third configuration for not-at-cell-edge UEs.

Aspect 18: The method of any of Aspects 1 through 17, wherein the UE is a reduced capability UE.

Aspect 19: The method of any of Aspects 1 through 18, wherein the UE is a non-reduced capability UE.

Aspect 20: An apparatus for wireless communication at a device, comprising a processor; memory coupled with the processor; and instructions stored in the memory and executable by the processor to cause the apparatus to perform the method of one or more Aspects of Aspects 1-19.

Aspect 21: A device for wireless communication, comprising a memory and one or more processors coupled to the memory, the one or more processors configured to perform the method of one or more Aspects of Aspects 1-19.

Aspect 22: An apparatus for wireless communication, comprising at least one means for performing the method of one or more Aspects of Aspects 1-19.

Aspect 23: A non-transitory computer-readable medium storing code for wireless communication, the code comprising instructions executable by a processor to perform the method of one or more Aspects of Aspects 1-19.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a network entity, a first configuration associated with radio resource management (RRM) measurement relaxation based at least in part on the UE being stationary,
      wherein the UE is stationary based at least in part on a difference between a threshold value and a serving cell received signal level (Srxlev) being less than a delta value for a period of time;
      receive, from the network entity, a second configuration, that is applicable only when the first configuration is enabled, associated with RRM measurement relaxation and associated with the UE not being located at a cell edge,
      wherein the UE is not located at the cell edge based at least in part on a signal strength of the UE satisfying another threshold value; and
      perform RRM measurements based at least in part on the first configuration and the second configuration.

2. The apparatus of claim 1, wherein the UE is associated with a fixed location, as indicated in a subscription associated with the UE.

3. The apparatus of claim 1, wherein the threshold value is specific to stationary UEs.

4. The apparatus of claim 1, wherein the first configuration is applied when the UE is in a radio resource control idle mode.

5. The apparatus of claim 1, wherein the one or more processors are further configured to:
   receive, from the network entity, an indication that the UE should disable the first configuration.

6. The apparatus of claim 1, wherein the second configuration is applicable to stationary UEs.

7. The apparatus of claim 1, wherein the one or more processors, to perform the RRM measurements, are configured to perform the RRM measurements based at least in part on a scaling factor associated with an interval of the RRM measurements, wherein the scaling factor is based at least in part on the UE being stationary and the UE being located at the cell edge.

8. The apparatus of claim 7, wherein the scaling factor associated with the RRM measurements is different for the UE that is stationary as compared to a scaling factor associated with the RRM measurements for a UE having low mobility.

9. The apparatus of claim 1, wherein the one or more processors, to perform the RRM measurements, are configured to stop the RRM measurements for a period of time based at least in part on the UE being stationary and the UE being not located at the cell edge.

10. The apparatus of claim 1, wherein the RRM measurements include one or more of: intra-frequency measurements, inter-frequency measurements, or inter-radio access technology measurements.

11. The apparatus of claim 1, wherein the first configuration is applied when the UE is in a radio resource control connected mode.

12. The apparatus of claim 1, wherein the one or more processors, to perform the RRM measurements, are configured to perform the RRM measurements based at least in part on parameters that are specific to a mode of the UE, wherein the mode is one of a radio resource control idle mode or a radio resource control connected mode.

13. The apparatus of claim 1, wherein the one or more processors, to receive the first configuration, are configured to receive the first configuration via dedicated signaling or via broadcast signaling.

14. The apparatus of claim 1, wherein the one or more processors are further configured to:
   transmit, to the network entity, capability signaling that indicates a capability of the UE; and
   receive the first configuration based at least in part on the capability signaling.

15. The apparatus of claim 1, wherein the one or more processors are further configured to:
   transmit, to the network entity, UE assistance information that indicates a request for the first configuration.

16. The apparatus of claim 1, wherein:
   the one or more processors, to receive the first configuration, are configured to receive the first configuration via a system information block while the UE is operating in a radio resource control connected mode; and
   the one or more processors, to perform the RRM measurements, are configured to perform the RRM measurements autonomously based at least in part on the first configuration.

17. The apparatus of claim 1, wherein the first configuration is included in a plurality of configurations available from the network entity, wherein the plurality of configurations include the first configuration, another configuration for low mobility UEs, and the second configuration for not-at-cell-edge UEs.

18. The apparatus of claim 1, wherein the UE is a reduced capability UE.

19. The apparatus of claim 1, wherein the UE is a non-reduced capability UE.

20. A method of wireless communication performed by a user equipment (UE), comprising:
- receiving, from a network entity, a first configuration associated with radio resource management (RRM) measurement relaxation based at least in part on the UE being stationary,
  - wherein the UE is stationary based at least in part on a difference between a threshold value and a serving cell received signal level (Srxlev) being less than a delta value for a period of time;
- receiving, from the network entity, a second configuration, that is applicable only when the first configuration is enabled, associated with RRM measurement relaxation and associated with the UE not being located at a cell edge,
  - wherein the UE is not located at the cell edge based at least in part on a signal strength of the UE satisfying another threshold value; and
- performing RRM measurements based at least in part on the first configuration and the second configuration.

21. The method of claim 20, wherein:
the UE is associated with a fixed location, as indicated in a subscription associated with the UE.

22. The method of claim 20, wherein:
the first configuration is applied when the UE is in a radio resource control idle mode; or
the first configuration is applied when the UE is in a radio resource control connected mode.

23. The method of claim 20, wherein the second configuration is applicable to stationary UEs.

24. A non-transitory computer-readable medium storing a set of instructions for wireless communication, the set of instructions comprising:
- one or more instructions that, when executed by one or more processors of a user equipment (UE), cause the UE to:
  - receive, from a network entity, a first configuration associated with radio resource management (RRM) measurement relaxation based at least in part on the UE being stationary,
    - wherein the UE is stationary based at least in part on a difference between a threshold value and a serving cell received signal level (Srxlev) being less than a delta value for a period of time;
  - receive, from the network entity, a second configuration, that is applicable only when the first configuration is enabled, associated with RRM measurement relaxation and associated with the UE not being located at a cell edge,
    - wherein the UE is not located at the cell edge based at least in part on a signal strength of the UE satisfying another threshold value; and
  - perform RRM measurements based at least in part on the first configuration and the second configuration.

25. The non-transitory computer-readable medium of claim 24, wherein:
the UE that is stationary is associated with a fixed location, as indicated in a subscription associated with the UE.

26. The non-transitory computer-readable medium of claim 24, wherein performing the RRM measurements comprises performing the RRM measurements based at least in part on a scaling factor associated with an interval of the RRM measurements, wherein the scaling factor is based at least in part on the UE being stationary and the UE being located at the cell edge, and wherein the scaling factor associated with the RRM measurements is different for the UE that is stationary as compared to a scaling factor associated with the RRM measurements for a UE having low mobility.

27. The non-transitory computer-readable medium of claim 24, wherein the one or more instructions, that cause the UE to perform the RRM measurements, cause the UE to stop the RRM measurements for a period of time based at least in part on the UE being stationary and the UE being not located at the cell edge.

28. An apparatus for wireless communication, comprising:
- means for receiving, from a network entity, a first configuration associated with radio resource management (RRM) measurement relaxation based at least in part on the apparatus being stationary,
  - wherein the apparatus is stationary based at least in part on a difference between a threshold value and a serving cell received signal level (Srxlev) being less than a delta value for a period of time;
- means for receiving, from the network entity, a second configuration, that is applicable only when the first configuration is enabled, associated with RRM measurement relaxation and associated with the apparatus not being located at a cell edge,
  - wherein the apparatus is not located at the cell edge based at least in part on a signal strength of the apparatus satisfying another threshold value; and
- means for performing RRM measurements based at least in part on the first configuration and the second configuration.

29. The apparatus of claim 28, wherein the second configuration is applicable to stationary UEs.

30. The apparatus of claim 28, wherein the means for performing the RRM measurements comprises:
means for stopping the RRM measurements for a period of time based at least in part on the apparatus being stationary and the apparatus being not located at the cell edge; or
means for performing the RRM measurements based at least in part on parameters that are specific to a mode of the apparatus, wherein the mode is one of a radio resource control idle mode or a radio resource control connected mode.

* * * * *